United States Patent
Herzog et al.

(10) Patent No.: US 8,776,353 B2
(45) Date of Patent: Jul. 15, 2014

(54) FASTENING SYSTEM FOR AN ELEMENT IN AN AIRCRAFT INTERIOR

(75) Inventors: Mark Herzog, Barsbüttel (DE); Dirk Humfeldt, Hamburg (DE); Uwe Schneider, Jork Königreich (DE); Oliver Thomaschewski, Hamburg (DE)

(73) Assignee: Airbus Operations GmbH (DE)

( * ) Notice: Subject to any disclaimer, the term of this patent is extended or adjusted under 35 U.S.C. 154(b) by 624 days.

(21) Appl. No.: 12/989,560

(22) PCT Filed: Apr. 23, 2009

(86) PCT No.: PCT/EP2009/054872
§ 371 (c)(1),
(2), (4) Date: Jan. 3, 2011

(87) PCT Pub. No.: WO2009/130268
PCT Pub. Date: Oct. 29, 2009

(65) Prior Publication Data
US 2011/0088243 A1    Apr. 21, 2011

Related U.S. Application Data (60) Provisional application No. 61/125,495, filed on Apr. 25, 2008.

(30) Foreign Application Priority Data

Apr. 25, 2008    (DE) .................. 10 2008 020 789

(51) Int. Cl.
*B23P 11/00*    (2006.01)
*B64D 11/00*    (2006.01)
*B64C 1/06*    (2006.01)

(52) U.S. Cl.
CPC .............. *B64C 1/066* (2013.01); *B64D 11/003* (2013.01)
USPC .................... 29/525.01; 244/129.5

(58) Field of Classification Search
USPC .................... 29/525.01; 244/129.5
See application file for complete search history.

(56) References Cited

U.S. PATENT DOCUMENTS

| | | | |
|---|---|---|---|
| 2,275,683 A | 3/1942 | Rutledge | |
| 3,968,863 A | 7/1976 | Reilly | |
| 4,050,208 A | 9/1977 | Pompei et al. | |
| 4,501,404 A | 2/1985 | Nelson | |
| 4,563,886 A * | 1/1986 | Kletzmaier et al. | 70/118 |
| 4,648,570 A | 3/1987 | Abdelmaseh et al. | |
| 4,758,030 A * | 7/1988 | Kupfernagel | 292/26 |
| 4,944,473 A * | 7/1990 | Kallies et al. | 244/129.5 |
| 5,083,727 A | 1/1992 | Pompei et al. | |
| 6,086,018 A | 7/2000 | Gobeil et al. | |
| 6,241,186 B1 | 6/2001 | Calnon | |
| 6,536,710 B1 | 3/2003 | Bobzien et al. | |
| 6,539,760 B1 * | 4/2003 | Letzel et al. | 70/276 |
| 6,848,654 B1 | 2/2005 | Mills et al. | |
| 6,883,753 B1 | 4/2005 | Scown | |
| 7,357,429 B2 * | 4/2008 | Eichenauer | 292/144 |
| 7,377,558 B2 * | 5/2008 | Schimmler | 292/137 |
| 2003/0209632 A1 | 11/2003 | Hessling | |
| 2004/0159134 A1 * | 8/2004 | Eichenauer | 70/278.1 |
| 2005/0184194 A1 | 8/2005 | Schaefer et al. | |
| 2006/0022087 A1 | 2/2006 | Defilla et al. | |
| 2006/0049310 A1 | 3/2006 | Park et al. | |
| 2006/0054742 A1 | 3/2006 | Druckman et al. | |
| 2006/0065783 A1 | 3/2006 | Mills | |
| 2006/0087127 A1 * | 4/2006 | Schimmler | 292/137 |
| 2007/0029813 A1 * | 2/2007 | Eichenauer | 292/144 |
| 2007/0166098 A1 | 7/2007 | Roth et al. | |
| 2007/0284479 A1 | 12/2007 | Pein et al. | |
| 2008/0078871 A1 * | 4/2008 | Munson et al. | 244/118.5 |
| 2008/0277527 A1 | 11/2008 | Fokken et al. | |
| 2009/0261202 A1 | 10/2009 | Horst et al. | |
| 2010/0243805 A1 | 9/2010 | Gross et al. | |

FOREIGN PATENT DOCUMENTS

| | | |
|---|---|---|
| CN | 1942676 A | 4/2007 |
| CN | 101002031 A | 7/2007 |
| DE | 19545899 A1 | 6/1997 |
| DE | 10220808 A1 | 12/2003 |
| DE | 102005030997 B3 | 12/2006 |
| DE | 102005054890 | 5/2007 |
| DE | 102006016509 A1 | 10/2007 |
| DE | 102007019821 A1 | 11/2008 |
| EP | 861781 | 9/1998 |
| EP | 0901964 A2 | 3/1999 |
| EP | 1630098 | 3/2006 |
| GB | 2169256 A | 7/1986 |
| JP | 51-032518 U | 3/1976 |
| JP | 56-136844 U | 3/1981 |
| JP | 60-000988 U | 1/1985 |
| JP | 2002072916 A | 3/2002 |
| WO | 9917958 A1 | 4/1999 |
| WO | 2006116074 A1 | 11/2006 |

* cited by examiner

*Primary Examiner* — Carl Arbes
(74) *Attorney, Agent, or Firm* — Lerner, David, Littenberg, Krumholz & Mentlik, LLP

(57) ABSTRACT

The invention relates to a method for fastening an element of airplane interior equipment to a supporting structure in an airplane, comprising the steps of connecting the element of the airplane interior equipment to a first fixing device by using a first locking device, pivoting the element of the airplane interior equipment relative to the supporting structure, and connecting the element of the airplane interior equipment to a second fixing device by using a second locking device. Thus the element of the airplane interior equipment is fastened relative to the supporting structure.

8 Claims, 8 Drawing Sheets

FASTENING SYSTEM FOR AN ELEMENT IN AN AIRCRAFT INTERIOR

CROSS-REFERENCE TO RELATED APPLICATIONS

This application is a national phase entry under 35 U.S.C. §371 of International Application No. PCT/EP2009/054872, filed Apr. 23, 2009, published in German, which claims the benefit of the filing date of German Patent Application No. 10 2008 020 789.6 filed Apr. 25, 2008, and of U.S. Provisional Patent Application No. 61/125,495 filed Apr. 25, 2008, the disclosures of which are hereby incorporated herein by reference.

The invention relates to the attachment of interior furnishings in aircraft. In particular, the invention relates to a latching device for detachably connecting a component with a second component, an attachment system for attaching an aircraft interior fitting element to an aircraft structure, a method for attaching an element of aircraft interior fitting element to a load-bearing structure in an aircraft, a method for removing an aircraft interior fitting element from a load-bearing structure in an aircraft, an aircraft with an attachment system according to the invention, and the use of an attachment system according to the invention in an aircraft.

Conventional attachment systems for attaching an aircraft interior fitting element to an aircraft structure are characterized by the secure retention of the element, and simultaneously allow an easy access. However, conventional attachment systems have a highly limited functionality, especially during the assembly process.

An object of the invention is to provide a user-friendly attachment system with simplified assembly capability.

This object is achieved by means of a latching device for detachably connecting a first component with a second component, an attachment system for attaching an aircraft interior fitting element to an aircraft structure, a method for attaching an aircraft interior fitting element to a load-bearing structure in an aircraft, a method for removing an aircraft interior fitting element from a load-bearing structure in an aircraft, an aircraft with an attachment system according to the invention, and the use of an attachment system according to the invention in an aircraft with the features according to the independent claims.

An exemplary embodiment of the present invention provides a latching device for detachably connecting a first component with a second component in an aircraft, wherein the latching device comprises a latching element attachable to a first component, a trigger element and a safeguard element, wherein the latching element is detachably securable in a first state by employing the trigger element, wherein the latching element is detachably securable in a second state by employing the safeguard element, wherein the latching element is movable from the first state to the second state by activating the trigger element and wherein the latching element is movable from the second state to the first state by activating the safeguard element.

Another exemplary embodiment of the present invention provides an attachment system for attaching an aircraft interior fitting element to an aircraft structure, wherein the attachment system comprises an aircraft interior fitting element, a first latching device according to the invention, which is rigidly coupled with the aircraft interior fitting element or the aircraft structure, a second latching device, which is rigidly coupled with the aircraft interior fitting element or the aircraft structure, a first fixation device, which corresponds with the first latching device and is rigidly coupled with the aircraft structure or aircraft interior fitting element and a second fixation device, which corresponds with the second latching device and is rigidly coupled with the aircraft structure or aircraft interior fitting element, wherein the first latching device and the first fixation device are rigidly detachably couplable, wherein the second latching device and the second fixation device are rigidly detachably couplable, wherein at least one of the first and second latching devices has a first partial region, wherein the first partial region is couplable with the first or second fixation device and a second partial region, wherein the second partial region is rigidly connectable with the aircraft interior fitting element and wherein the at least one of the first and second latching devices, comprising the first and second partial region, is adapted to pivot the aircraft interior fitting element relative to the first and second fixation device.

Another exemplary embodiment of the present invention provides a method for attaching an aircraft interior fitting element to a load-bearing structure in an aircraft, comprising the steps of connecting the aircraft interior fitting element by employing a first latching device to a first fixation device, pivoting the aircraft interior fitting element relative to the load-bearing structure and connecting the aircraft interior fitting element by employing a second latching device to a second fixation device, such that the aircraft interior fitting element is fixed relative to the load-bearing structure.

Another exemplary embodiment of the present invention indicates a method for removing an aircraft interior fitting element from a load-bearing structure in an aircraft, comprising the steps of manually detaching the first or second latching device, pivoting the aircraft interior fitting element relative to the load-bearing structure, and manually detaching the remaining second or first latching device.

Another exemplary embodiment of the present invention indicates an aircraft with an attachment system according to the invention.

Another exemplary embodiment of the present invention indicates the use of an attachment system according to the invention in an aircraft.

An exemplary embodiment of the present invention descriptively describes an attachment system for an aircraft interior fitting element on the load-bearing aircraft structure. The aircraft interior fitting element may here be construed as any component that requires that it be fixed in place in relation to the aircraft structure inside the aircraft essentially without play.

In this conjunction, this may be a luggage stowing option, a so-called overhead bin. These stowage areas are regarded as storage options essentially in the head area or crown area of the aircraft structure.

They allow passengers and crewmembers alike to store luggage or other important material, such as blankets, first-aid equipment, emergency oxygen systems, etc. in a simple and easily accessible manner, and keep them easily and quickly at hand. However, other fixture items in an aircraft can also be included among the latter, such as monuments or aircraft interior fittings in general, for example toilet areas in an aircraft, or fixture items in the aircraft galley, such as cabinets with heating devices or devices for preparing meals and beverages, such as coffee, stowage areas for trolleys, crew rest compartments.

Or they can also be understood as including the cladding of the aircraft structure itself; such as cladding panels, separating walls, intermediate walls with safety doors if required, or even simple aircraft seats, designated as economy, business or first class depending on how they are equipped.

In order to ensure that the attachment is sufficiently safe and free of play, the respective aircraft interior fitting element is secured to the load-bearing structure in the aircraft at least at two different points.

This can be accomplished, for example, using dual-T beams as the assembly rails, which are attached to the aircraft structure or aircraft fuselage over large areas or at least expansive sections.

These carriers, also called tracks, themselves here have attachment features that correspond with other latching devices or attachment systems, thereby enabling a reliable and essentially play-free attachment.

While free of play might in this conjunction be understood as being essentially secured rigidly to the aircraft structure, it naturally permits minimal movements to surmount possibly arising loads owing to vibration or stresses, for example those that arise in the aircraft hull, without any damages.

Also conceivable are individual assembly elements, which can be secured at points to the aircraft structure, and exhibit a corresponding attachment option.

Special focus is here placed on a simple, uncomplicated and rapid assembly.

For example, it is possible, when first setting up the aircraft in the assembly shop, to attach the respective aircraft interior fitting elements in a rapid and uncomplicated manner at a minimal personnel outlay.

It is likewise conceivable, based on easy attachment and detachment capabilities offered by the present invention, to effect a short-term retrofitting of the aircraft interior fittings, for example between two flights or overnight.

The aircraft interior fitting element is here first attached to one of the at least two tracks or a first point of attachment. A hinged or pivoting attachment to the first track now enables a subsequent swivelable assembly, wherein the aircraft interior fitting element is then detachably attached to a second track or second point of attachment by way of a second latching device.

This inwardly or outwardly pivoting, shifting assembly motion provides optimal access to the element or aircraft structure with its load-bearing tracks at any time during the assembly process.

The automatic, user-independent latching of the latching devices can here be regarded as another special feature, and during assembly ensures a simple, uncomplicated and most importantly safe and reproducible latching of the aircraft interior fitting element to the aircraft structure via the at least two tracks.

As a result, even auxiliary personnel who have received only brief training can essentially perform the assembly process quickly and reliably.

Additional exemplary embodiments of the present invention may be gleaned from the dependent claims.

The configuration of the latching device for detachably connecting a first component with a second component will be described in the following. However, these embodiments also relate to the attachment system for attaching an aircraft interior fitting element to an aircraft structure, the method for attaching an aircraft interior fitting element to a load-bearing structure in an aircraft, the method for removing an aircraft interior fitting element from a load-bearing structure in an aircraft, the aircraft with an attachment system according to the invention, and the use of an attachment system according to the invention in an aircraft.

Another exemplary embodiment of the present invention provides a device, the device further having a housing, wherein the housing has a first opening, and a first fixation device securable to a second component can be introduced into the latching device through the first opening, wherein introducing the first fixation device into the latching device makes it possible to switch the latching element from the first state to the second state, and wherein the first fixation device and the latching device can be fixed in place relative to each other in the second state.

An essentially automatic attachment can here be realized by simply introducing the first fixation device into the latching device. In the introduced state, the latching element can be actuated, and switched from its first state to the second state. In the second state, the latching element and fixation device intermesh in such a way as to secure the fixation device and latching device essentially free of play relative to each other.

The attachment can here take place without any action from outside, and hence without the necessity of more extensive monitoring and assembly operations.

Another exemplary embodiment of the present invention provides a device, wherein introducing the first fixation device into the latching device makes it possible to actuate the trigger element, so that the latching element is switched from the first state to the second state.

The trigger element can here secure the latching device or latching element in the first state in a defined manner. By introducing the first fixation device into the latching device, the trigger element is subsequently automatically actuated, the latching device or latching element is switched to its second state, as a result of which the fixation device and latching device are secured essentially free of play relative to each other.

Another exemplary embodiment of the present invention provides a device, wherein the housing further has a second opening, wherein an unlatching element can be introduced into the latching device through the second opening, wherein introducing the unlatching element into the latching device makes it possible to switch the latching element from the second state into the first state, and wherein the first fixation device and the latching device can be freely moved relative to each other in the first state.

The manual, external incorporation of the unlatching element into the latching device makes it possible to switch the latter from its second, latched, closed state to the first, unlatched, open state. The manual introduction can here also be understood as another safety measure, making it impossible for the second, latched, closed state to become automatically detached.

The level of safety can be further increased by virtue of the fact that the unlatching element in a latched state is not attached or mounted to, in or by the latching device. Introducing the unlatching element into the latching device makes it possible to switch the latching element from the second to the first state, and the trigger element can now, in the first state, again safeguard the latching element in the first state. The safeguard element, which can be used to securely keep the latching element in the second state, can here be unlatched manually before or automatically while introducing the unlatching element.

Another exemplary embodiment of the present invention provides a device that additionally has at least one force element arranged on at least one of the elements from the group comprised of latching element, trigger element, safeguard element and locking element, wherein the at least one force element detachably secures the at least one element in one of the first and second states.

A force element can here be understood as any element suitable for exercising a directed, reproducible force on one of the elements. For example, it can be understood as a spring component, which is able to hold the respective element in its latched state. Components and elements of other configurations are also conceivable.

As a result, it can be ensured that the elements cannot be switched from their secured, latched, closed state to their detached, open, unsecured state, whether independently or due to slight inadvertency.

Another exemplary embodiment of the present invention provides an attachment system, wherein the first partial region is designed so that it can move relative to the second partial region.

Such a configuration can provide a comfortable and essentially low-friction way of pivoting the two partial regions relative to each other, so as to enable the subsequent pivoting motion of the aircraft interior fitting element.

Another exemplary embodiment of the present invention provides an attachment system, wherein the second latching device is designed in the first partial region as a latching device according to the invention.

As a consequence, the first and even second latching device can be designed as an identical latching device, the second at least in the first partial region.

This makes it possible to further increase the user friendliness of the present system, since no different latching devices are now encountered. Operation of the first and second latching device can hence be essentially identical, thereby effectively preventing errors in use.

Another exemplary embodiment of the present invention provides an attachment system, wherein the second latching device has a locking element in the first area, and this locking element couples the second latching device and second fixation device in a detachably rigid manner This enables a simple and reliable connection between the latching device and fixation device, which can subsequently also be easily detached again.

Configuring the locking element in an area that does not absolutely have to be accessible from outside also prevents an unlatching from taking place at a time when the respective other, first latching device is still rigidly coupled with the first fixation device.

Another exemplary embodiment of the present invention provides an attachment system, wherein at least one force element is arranged on the locking element, wherein the force element detachably secures the locking element in a latched state relative to the second latching device and second fixation device.

This makes it possible to ensure that the coupling will not be manually, possibly unintentionally detached, or automatically and unintentionally detached or slide away from the latching device and fixation device.

As a consequence, the latching device and fixation device can only be detached from each other by way of a conscious, intentional, manual action.

Another exemplary embodiment of the present invention provides an attachment system, wherein the first partial region is designed so that it can move relative to the second partial region using at least one element from the group consisting of a hinge joint, sliding joint, curved joint, screw joint, sliding-hinge joint, ball joint and plate joint.

Any combination of the above hinges is also conceivable.

The use of such a joint, which is possibly standardized, makes it possible to easily join the two partial regions, wherein the respective ideal movement capability can be provided, depending on the realization intended.

In like manner, a first movement can be defined based exclusively on the targeted selection of a corresponding joint.

Another exemplary embodiment of the present invention provides an attachment system, wherein the aircraft interior fitting element is in an attached state relative to the aircraft structure, wherein one of the first and second latching devices is coupled with one of the first and second fixation devices in this attached state, and can be attached essentially free of play.

In this conjunction, free of play may be understood as meaning that the aircraft interior fitting element is secured relative to the aircraft structure essentially without any great capability to move any further.

Arising vibrations or deformations resulting from exposure of the aircraft structure and/or aircraft interior fitting element to a load can here be followed or permitted, however, so that when one of the aircraft interior fitting elements and aircraft structure is exposed to a load or deformation, the respective other one will not be deformed.

In order to achieve an attachment according to the invention that is essentially free of play, the aircraft interior fitting element can be provided with at least one first and one second latching device. In like manner, however, it is conceivable to provide a plurality of first or second latching devices, which can be coupled with a plurality or the same counterparts of the first and second fixation device.

Exemplary embodiments of the present invention will be described below, drawing reference to the method for attaching an aircraft interior fitting element to a load-bearing structure in an aircraft. However, these exemplary embodiments also apply to the latching device for detachably connecting a first component with a second component for the attachment system for attaching an aircraft interior fitting element to an aircraft structure for an aircraft with an attachment system according to the invention [sic], for the use of an attachment system according to the invention in an aircraft, and for the method for removing an aircraft interior fitting element from a load-bearing structure in an aircraft.

Another exemplary embodiment of the present invention presents a method involving the steps of automatically, detachably latching the first latching device during attachment to the first fixation device, automatically, detachably latching the second latching device during attachment to the second fixation device by introducing the second fixation device into the second latching device, and automatically, detachably securing at least one of the first and second latching devices in its latched state using a safeguard element.

The respective automatic, yet detachable latching of the latching device to the respective fixation device combined with the automatic, yet detachable safeguarding of at least one of the first and second latching devices in the latched state provides for a greatly simplified assembly.

For example, focus during attachment can be placed mainly on the correct fit of the aircraft interior fitting element, without having to also check for secure latching and safeguarding.

This also makes it possible to increase the speed of assembly.

Exemplary embodiments of the present invention will be described below, drawing reference to the method for removing an aircraft interior fitting element from a load-bearing structure in an aircraft. However, these exemplary embodiments also apply to the latching device for detachably connecting a first component with a second component, for an attachment system for attaching an aircraft interior fitting element to an aircraft structure, for the method for attaching an aircraft interior fitting element to a load-bearing structure in an aircraft, for an aircraft with an attachment system according to the invention, and for the use of an attachment system according to the invention in an aircraft.

Another exemplary embodiment of the present invention presents a method involving the additional steps of manually unlatching the safeguard element of the first or second latching device, manually unlatching the latching element of this first or second latching device by introducing an unlatching element into this first and second latching device, and manually unlatching the locking element of the remaining second or first latching device The process of manually unlatching makes it possible to effectively protect the respective safeguarding or latching or locking elements against a random, inadvertent or erroneous unlatching.

A configuration providing that the respective manual unlatching operations can only be performed in a specific, incremental and interdependent sequence further increases the safety with which the aircraft interior fitting element is attached.

For example, the latching element can only be manually unlatched after the safeguard element has been manually unlatched, whereupon the locking element can only be manually unlatched after the latching element has been manually unlatched and/or any required pivoting motion has been performed.

Exemplary embodiments of the present invention are depicted on the following figures, and will be explained in greater detail below.

Same or similar components in different figures are provided with identical reference numbers.

The depiction on the figures is schematic, and not to scale, but can reflect qualitative size proportions.

Shown on.

Figure 1:
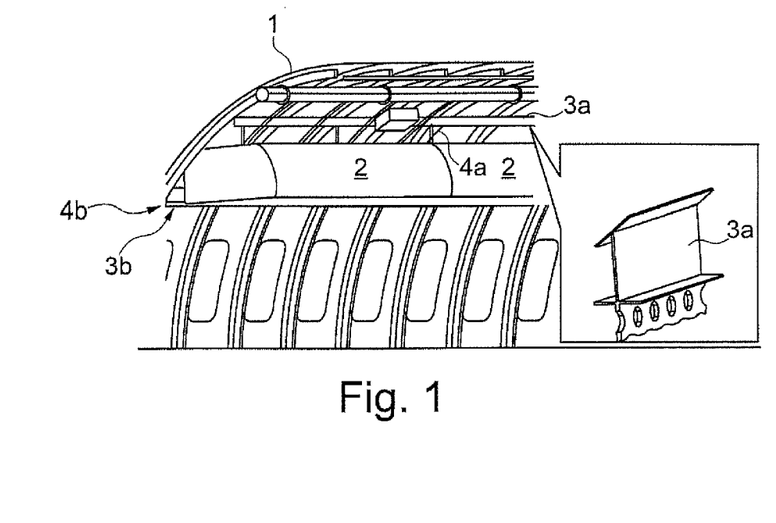
FIG. 1 is a diagrammatic view of the arrangement of an aircraft interior fitting element secured to a load-bearing structure of an aircraft.

Drawing reference to FIG. 1, the attachment of an aircraft interior fitting element 2 (here shown as an overhead bin) to a fuselage 1 is depicted below. Element 2 is here attached by way of a first and second fixation device 3*a*, *b*, which are essentially connected with the aircraft structure or fuselage 1. Only diagrammatically depicted first and second latching devices 4*a*, *b* are located between the element 2 and the first and second fixation device 3*a*, *b*.

As shown here, the element 2 has at least two latching devices 4*a*. However, it is also conceivable that an attachment be realized exclusively using a first latching device 4*a* or more than two first latching devices 4*a*. Configurations involving one or a plurality of latching devices are also conceivable for the second latching device 4*b*.

The number depends on how the respective latching device 4*a*, *b* is dimensioned, and should in particular take into account the arising loads during normal operations in an aircraft.

Exemplary embodiments of the fixation device will be described below, drawing reference to FIGS. 2, 3*a* and 3*b*.

This exemplary embodiment of the fixation device 3*a*, *b* has two different T elements 5*a* and 5*b*, as well as a hole element 6.

T element 5*a* is here angled, but can also be designed perpendicular to the plane of the hole element, and hence be essentially parallel to the T element 5*b*.

However, the fixation device can also be configured in other ways, which essentially involve a hole element 6 or at least a portion thereof, so as to enable a reliable attachment reflecting the idea underlying the invention.

For example, the T element 5*a* is connected over a large surface of the aircraft structure or fuselage 1, or secured thereto, and thereby permits the transfer of forces to the aircraft structure 1 over a large surface area.

The aircraft structure 1 and T element 5*a* can here be connected by way of riveting, welding, soldering, compressing or similar joining processes. In like manner, the T element 5*a* can be integrated as a single piece into the aircraft structure 1.

T element 5*b* is directly attached to the hole element 6, and situated perpendicular to this hole element 6. It can serve as a stop or spacer on the one hand, thereby ensuring a defined introduction of the fixation device into the latching device.

Figure 2:
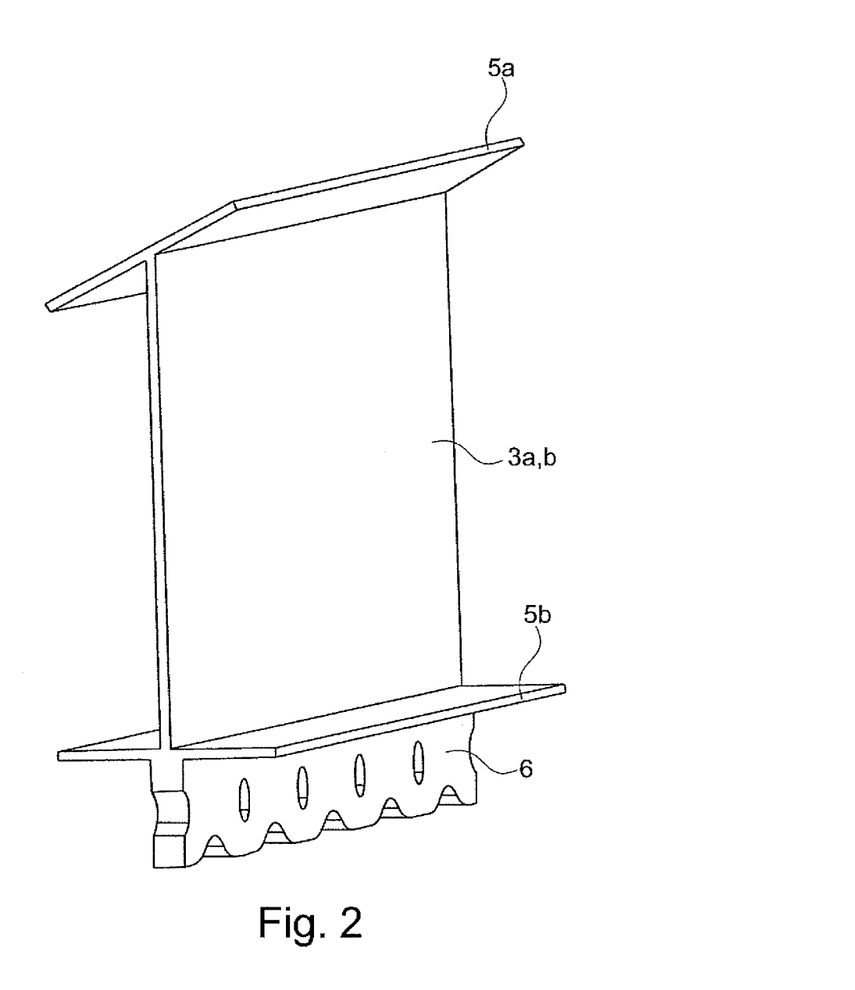
FIG. 2 is an exemplary embodiment of a fixation device.
Figure 3A:
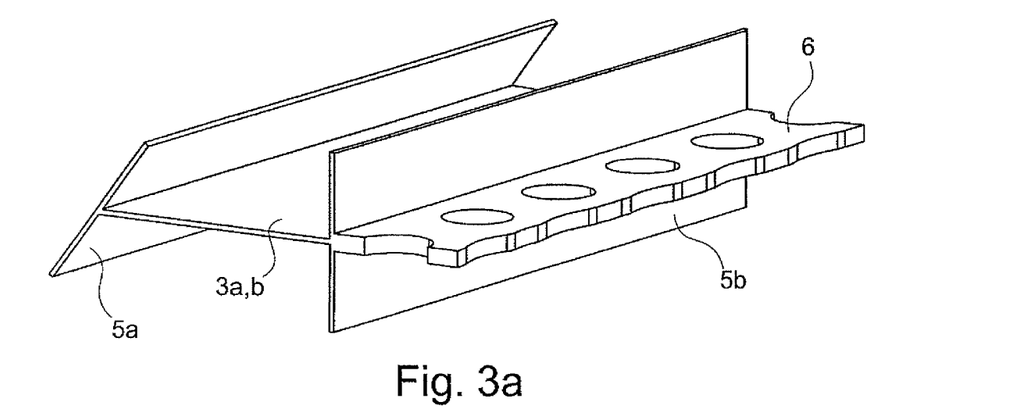
FIG. 3 are other exemplary embodiments of a fixation device.
Figure 3B:
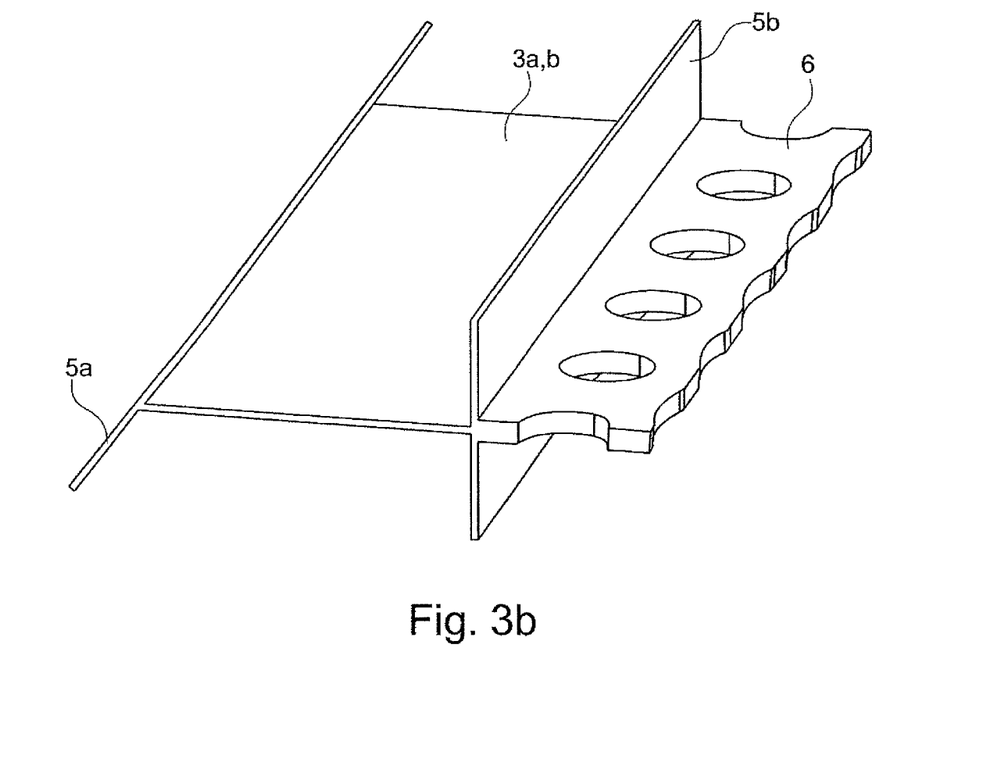

The holes in the hole element 6 are the same size as depicted on FIG. 2, 3*a*, *b*; however, it is also conceivable for the sequence of sizes to differ, so as to offer more leeway in determining positions on the respective fixation device 3*a*, *b*.

Depending on the positioning of the fixation device 3*a*, *b*, it is also possible to configure the holes there differently in terms of their size, for example to effectively prevent erroneous or twisted assembly.

In its function as a stop element, T element 5*b* can here further activate the trigger element 14, so as to move the latching element 13 from a first to a second state in this way.

Both the latching element 13 and the first and second latching device 4*a*,*b* or the first partial region 7*a* of the first or second latching device 4*a*,*b* can be coupled with the holes of the hole element 6.

Drawing further reference to FIG. 4*a* to *c*, an exemplary embodiment of a latching device 4 of the present invention will be described.

Figure 4A:
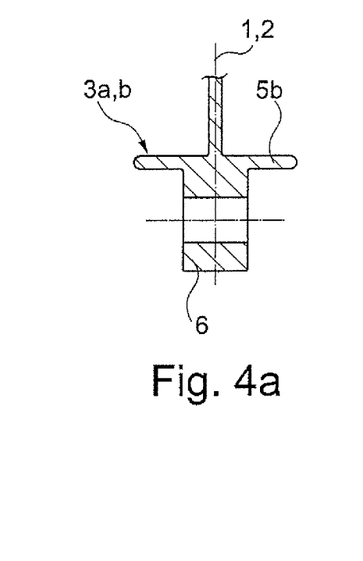
FIG. 4*a* to *c* is an exemplary embodiment of a latching device of the present invention.

Shown diagrammatically again on FIG. 4*a* is a sectional drawing of the fixation device 3*a*,*b*. FIG. 4*b* and c present a latching device according to the present invention, rotated by 90° relative to each other.

The latching device 4 has a first partial region 7*a* and a second partial region 7*b*. The second partial region 7*b* can be secured either to the aircraft structure 1, or to the aircraft interior fitting element 2.

The two partial regions 7*a*,*b* are moveably mounted relative to each other, depicted here via movement option 10. The latter is shown by example on FIG. 4*b* or 4*c* as a hinge joint.

Therefore, the first partial region 7*a* can be pivoted in relation to the second partial region 7*b*, and hence either relative to the aircraft structure 1 or element 2, depending on which of the two 1, 2 the second partial region 7*b* is secured to.

The first partial region 7*a* is here designed as an essentially round or slightly rod-shaped element in its end region, which corresponds to at least one hole of the hole element 6.

Figure 4B:
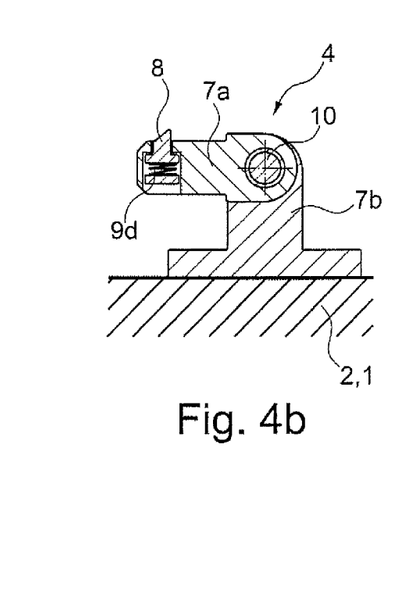

By sliding the first partial region 7*a* into a hole of the hole element 6, the locking element 8 is automatically inserted into its retracted resting position shown on FIG. 4*b*, and then, once the partial region 7*a* has been passed through a hole of the hole element 6, is moved toward the outside again into its rest position by the force element 9*d*.

Force element 9*d* is here diagrammatically shown as a spring element. Automatic latching is here accomplished via the slightly beveled configuration of the locking element 8, which allows it to slide out and/or in during insertion into the hole of the hole element 6.

By contrast, the side of the locking element 8 facing the hole element and situated in the rear in the inserted state has no beveled edge, so that the lock cannot be automatically released when attempting to withdraw the first partial region 7*a* from the hole of the hole element 6, but is rather effectively prevented.

As a consequence, the first partial region 7*a* is secured in relation to the fixation device 3*a,b* in the inserted state.

The fixation device 3*a,b* is in turn connected either with an aircraft interior fitting element 2 or the fuselage 1, a state not shown here. The respective connection of the fixation device 3*a,b* and latching device 4*a,b* to the aircraft structure or fuselage 1 and aircraft interior fitting element 2 mutually preclude each other, however.

Figure 4C:
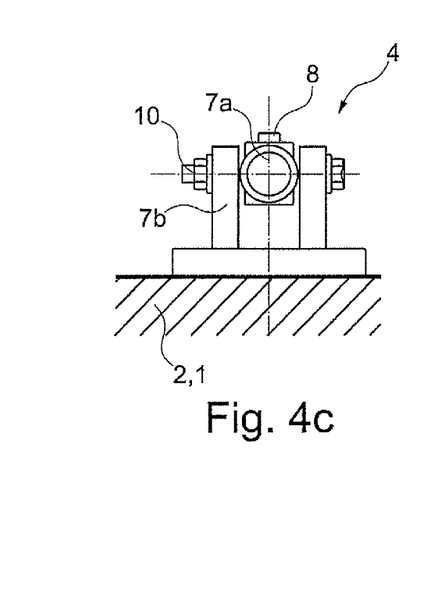

FIG. 4*c* shows the latching device 4 of FIG. 4*b* rotated by 90°. Visible here in particular is how the locking element 8 projects over the circular cross section of the first partial region 7*a*, and hence secures and latches it relative to the fixation device 3*a,b* in an inserted state in the hole of the hole element.

Another exemplary embodiment of the latching device 4 of the present invention will be described below, drawing reference to FIG. 5*a* to *c*.

Figure 5A:
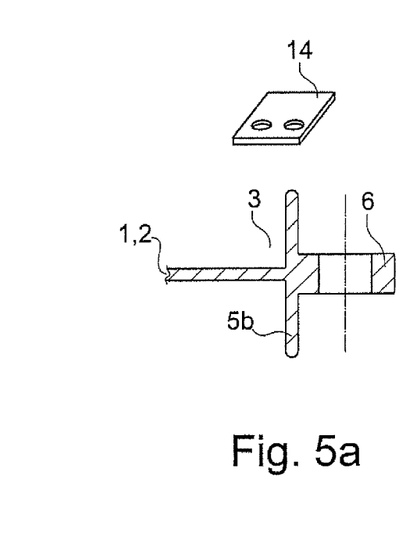
FIG. 5*a* to *c* is another exemplary embodiment of a latching device of the present invention.

FIG. 5*a* again depicts a fixation device 3*a,b* with its T element 5*b* and hole element 6. The fixation device 3 is attached either to the aircraft structure or fuselage 1, or to the aircraft interior fitting element 2.

Figures 5B, 5C:
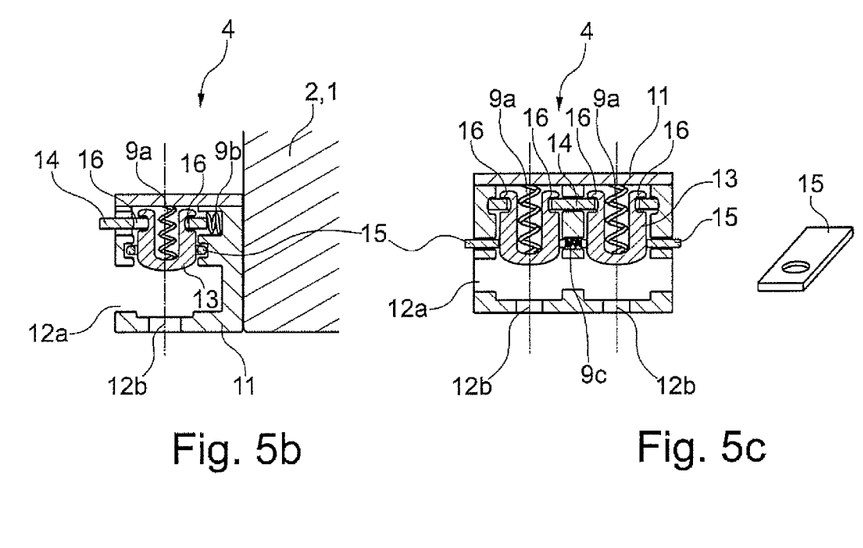

In a corresponding position, FIG. 5*b* shows a latching device 4 according to an exemplary embodiment of the present invention.

The latching device 4 has a housing 11, which itself is attached to the aircraft structure 1 or aircraft interior fitting element 2.

The attachments of fixation devices 3 and latching devices 4 preclude each other in this case as well. Situated on the housing is the first housing opening 12*a* corresponding with the hole element 6 of the fixation device 3.

The hole element 6 can be introduced into the latching device 4 via the first opening 12*a*. The latching device 4 further has a first latching element 13, the inside of which incorporates a force element 9*a*, shown here as a spring element.

A partial region of the latching element 13 further incorporates a groove 16, wherein the groove 16 is designed to correspond both with a trigger element 14 and a safeguard element 15.

Trigger element 14 or trigger element 15 are able to engage into this groove, and secure or keep the latching element 13 in the respective first or second state. FIG. 5*b,c* only show the first, open, unlatched state.

In addition, both the trigger element 14 and safeguard element 15 have force elements 9*b,c*, here also shown as spring elements. The latter keep the trigger element 14 in the groove 16 of the latching element 13 in the first state, and keep the safeguard element 15 in the groove 16 of the latching element 13 in the second, latched state (not depicted).

Both the trigger element 14 and safeguard element 15 shown are essentially the same in design, and comprise an essentially oblong element.

A partial region of the element exhibits a hole-shaped opening, which interacts with the latching element 13 in such a way that it can freely move in the hole-shaped opening on the one hand, while the trigger element 14 or safeguard element 15 can be introduced into the groove 16 of the latching element 13 by the force element 9*b,c* on the other.

When introducing the trigger element 14 or safeguard element 15 into the groove, the latching element 13 is held in the respective first or second state.

FIGS. 5*b* and 5*c* are here again shown rotated by 90°.

When introducing the hole element 6 of the fixation device 4 via the first opening 12*a* into the latching device 4, the trigger element 14 presses against the T element 5*b*, and as a result is moved from its secured state into an unsecured state, exposed to the force exerted by the force element 9*b*.

In this case, the trigger element 14 no longer engages into the groove 16 of the latching element 13, as the latter is subsequently moved via the force element 9*a* through at least one hole of the hole element 6, thereby also using the force exerted by the latching element 13 in the hole of the hole element 6 to secure the latching device 4 relative to the fixation device 4. The hole in the hole element 6 and the latching element 13 correspond to each other in such a way as to enable a latching or fixation that is essentially free of play.

In the second state, in which the latching element 13 was inserted via the force element 9*a* through the hole of the hole element, the force exerted by the force element 9*a* causes the safeguard element 15 to itself move into the groove 16 of the latching element 13 and secure it in the second, retracted, latched state.

FIG. 5*c* shows an essentially symmetrical configuration of the latching device 4 with two parallel latching elements 13, trigger elements 14 and safeguard elements 15.

In this exemplary embodiment, the individual latching elements 13, trigger elements 14 and safeguard elements 15 each move perpendicular to each other. However, other configurations are also possible.

A manual operation is subsequently possible to then detach the latching device 4 from the fixation device 3.

They are detached from each other by first manually shifting the safeguard element 15 against the force exerted by the force element 9*c* and out of the groove 16 of the latching device 13, for example by pressing together with the fingers, or using some other configuration. This may then again be movable freely within the opening of latching device 13.

However, the latching element is only held in the latched, second state by the force exerted by the force element 9*a*. An unlatching element (not diagrammatically shown) will now be manually introduced into the latching device 4 via the second housing opening 12*b*.

This unlatching element can be designed as a simple ram or pin, which has a shape essentially corresponding to the second housing opening 12*b*. The unlatching element is introduced into the housing 11 via the second housing opening 12*b*, and moves the latching element 13 from the second into the first state under exposure to the force exerted by the force element 9*a*.

In the first state, the trigger element 14 again engages into the groove 16 of the latching element 13, and keeps it in the first state. The unlatching element can now be removed form the housing 11, and the trigger element 14 keeps the latching element 13 in the first state.

The latching element 13 now no longer engages the hole of the hole element 6, so that the latching device 4 and fixation device 3 can once again be moved relative to each other. The latching device 4 can subsequently be removed from the fixation device 3, or vice versa.

Another exemplary embodiment of the latching device 4 of the present invention will be described below, drawing reference to FIG. 6*a* to *e*.

Figures 6A, 6C:
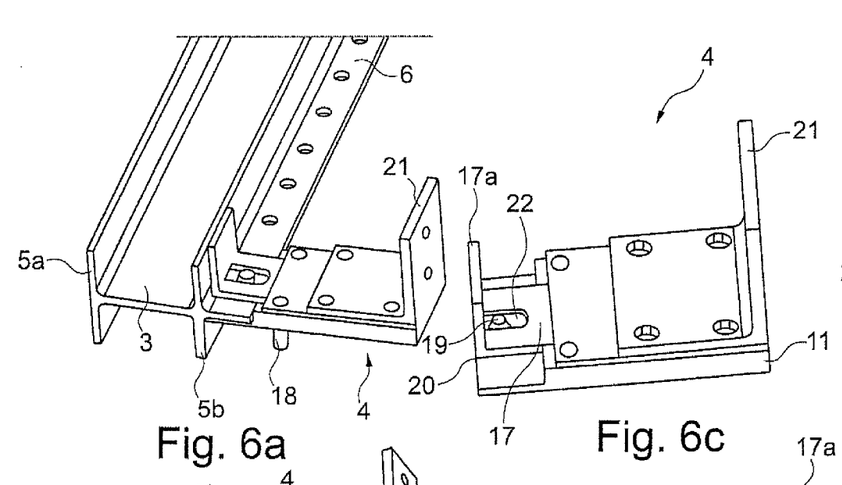
FIG. 6*a* to *e* is another exemplary embodiment of a latching device of the present invention.
Figure 6B:
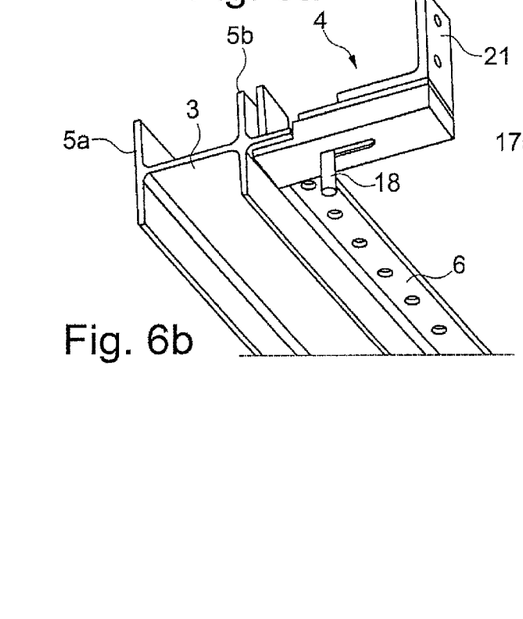
Figure 6D:
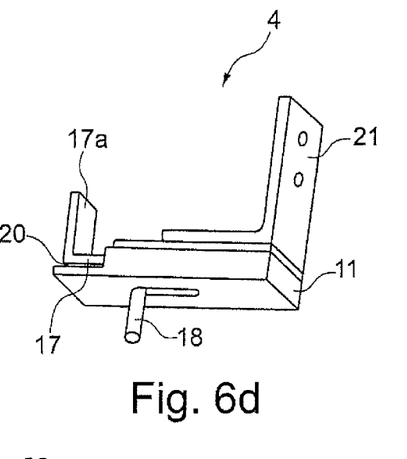
Figure 6E:
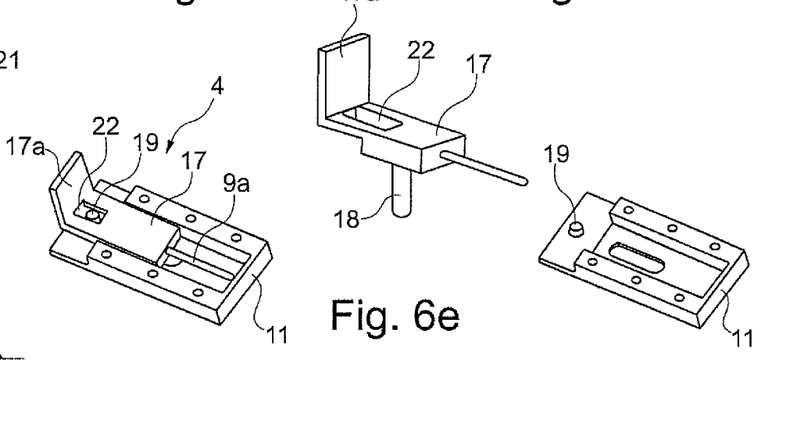

FIGS. 6*a* and 6*b* show a diagrammatic top and bottom view of a fixation device 3 with T elements 5*a, b* and the hole element 6.

The latching device 4 is shown in the latched state on the hole element 6. In the housing 11, the latching device on FIG. 6*c* has a sliding element 17, wherein the face part 17*a* of the sliding element 17 is pressed against the hole element 6 in the state to be closed.

Pressing the face part 17*a* against the hole element 6 presses the face part 17*a* toward the attachment side 21. The attachment side 21 is in turn used to attach the latching device 4 either to the aircraft structure 1 or to the aircraft interior fitting element 2, and the fixation device 3 to the respective other of the two 1, 2. Sliding back the sliding element 17 with the face part 17*a* releases an opening 20 underneath, the thickness of which essentially corresponds with the thickness of the hole element 6, so as to achieve the required play-free attachment.

The sliding element 17 further has a recess 22. The floor of the housing 11 incorporates a nose 19, wherein the nose 19 essentially corresponds with a hole of the hole element 6, so as to ensure the essentially play-free attachment as before.

The recess 22 in the sliding element 17 here enables a configuration of the nose 19, which hence is higher than the hole element 6 is thick.

As mentioned previously, the sliding element 17 is shifted toward the attachment element 21 when introducing the latching device 4. The nose 19 is exposed, introduced into a corresponding hole of the hole element 6, as a result of which the corresponding thickness of the hole element 6 and the opening 20 again releases the sliding element.

A force element 9*a*, which itself generates a force on the sliding element 17 toward the fixation device 3, is used to shift the sliding element 17 back into its resting position. After shifted back, the hole element 6 lies between the lower side of the housing 11 and the sliding element 17, latched via the nose 19.

As a result, pushing the latching element 13 creates a detachable and essentially play-free connection between the fixation device 3 and latching device 4.

The unlatching element 18 is manually actuated in the latched state to unlatch, and hence detach, the fixation device 3 and latching device 4. This unlatching element 18 is also secured to the sliding element 17, and projects out of the bottom side of the housing 11 through a lower opening. By manually shifting the unlatching element 18 against the force exerted by the force element 9*a* toward the attachment element 21, the sliding element 17 is pushed back again, thereby exposing the hole element 6, and the latching device 4 can be removed from the fixation device 3.

It is further possible, even though not depicted on FIGS. 6*a* to 6*e*, to prevent the unlatching element 18 from manually shifting beforehand by way of a safeguard element, which is also manually actuated.

The method for attaching and removing the aircraft interior fitting element 2 according to the present invention will be described below, drawing reference to FIG. 7.

Figure 7:
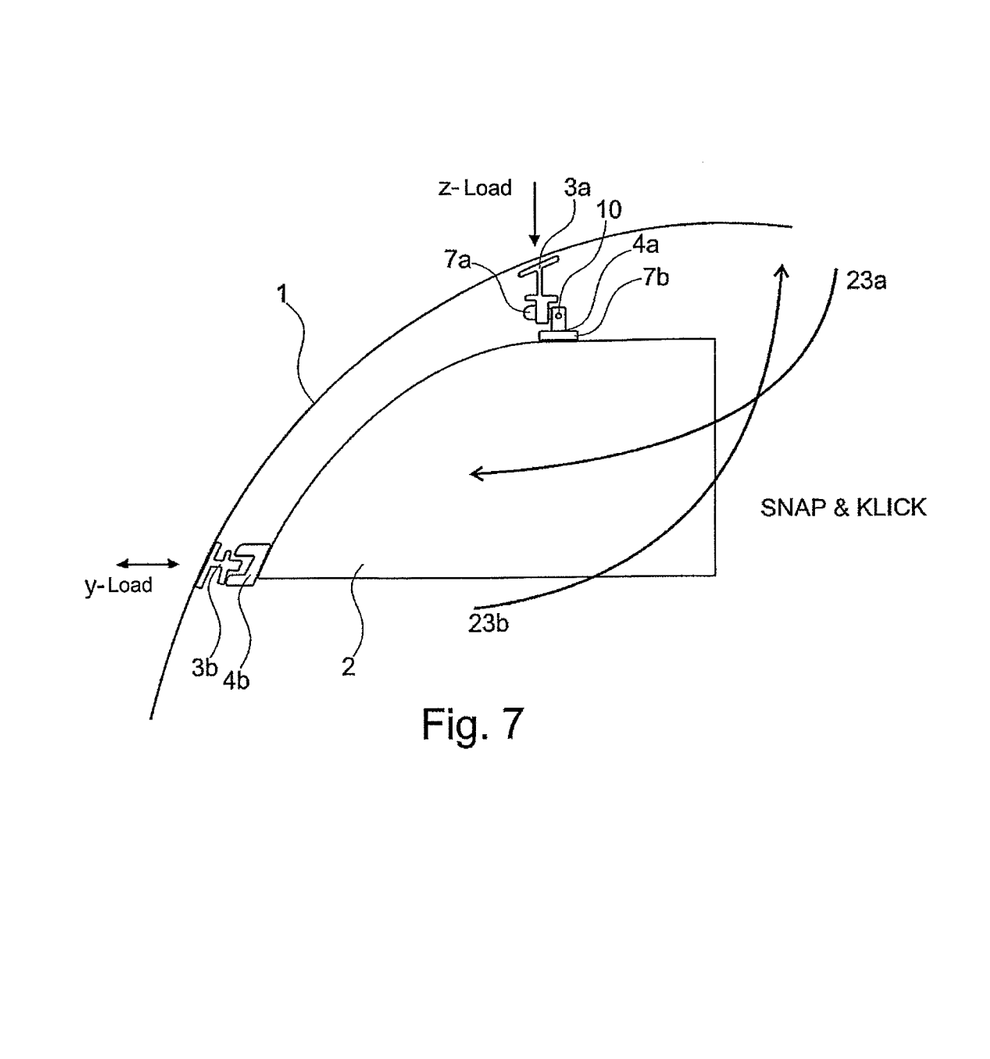
FIG. 7 is a diagrammatic illustration of the method according to the invention for attaching and removing an aircraft interior fitting element.

FIG. 7 shows an element of the aircraft interior fitting element 2, here shown diagrammatically as an overhead bin, as well as the aircraft structure or fuselage 1, and hence the outer hull 1.

Element 2 is secured to the first and second fixation device 3*a,b* by means of a first and second latching device 4*a,b*. Shown here diagrammatically is a first latching device 4*a* according to FIG. 4*a* to *c*, as well as a second latching device 4*b* according to FIGS. 5*a* to 5*c*. The first fixation device 3*a* here essentially corresponds to the one on FIG. 2, and the second fixation device 3*b* here essentially corresponds to the fixation device 3 shown on FIG. 3*a* and *b*.

During assembly, the first latching device 4*a* is inserted in a hole of the hole element 6 of the first fixation device 3*a*. This insertion latches the locking element, and keeps the first latching device 4*a* connected with the first fixation device 3*a*. The movement option 10 now movably joins the element 2 via the first latching device 4*a* with the first fixation device 3*a*, and by way of the latter with the fuselage 1.

The arrow 23*a* describes the pivoting motion for the attachment. Element 2 is pivoted via the movement option 10 in the direction of the arrow 23*a*. The attachment system is here dimensioned in such a way that the second fixation device 3*b* is introduced into the first housing opening 12*a* of the second latching device 4*b* and latched as before.

This enables a simple assembly, since the respective components 3*a,b* and 4*a,b* are sufficiently visible during the entire assembly process. In addition, given a latched first latching device 4*a* with the first fixation device 3*a*, essentially no more force must be applied to hold the element 2 under its own weight.

This results from the fact that the first fixation device 3*a* and first latching device 4*a* are essentially over the center of gravity of element 2.

As a consequence, exclusively Z loads are essentially relayed to the aircraft structure 1 via the first latching device 4*a* and first fixation device 3*a*.

Pivoting and latching in the second latching device 4*b* and second fixation device 3*b* establishes a further connection between the element 2 and aircraft structure 1.

Only loads in the Y-direction (transverse to the aircraft longitudinal axis) are essentially transmitted via this connection. As the result of a suitable, repeating configuration of the first and second fixation devices 3*a,b* and first and second latching devices 4*a,b*, slight shear stresses convey loads in an X-direction (parallel to the aircraft longitudinal axis), meaning in the direction of the aircraft longitudinal axis over a large surface, to the aircraft structure via elements 3*a*, 4*a*, 3*b*, 4*b* as well.

As described previously, the individual fixation and latching devices are here automatically latched and secured to each other.

The removal of element 2 is in turn described on FIG. 7 by the pivoting motion, as denoted by arrow 23*b*. The unlatching element (not shown in any more detail) is here first introduced into the second latching device 4*b* via the second housing opening 12*b*.

The safeguard element 15 must be manually unlatched beforehand, so that the unlatching element can be used to move the latching element 13 from its second, secured state connected with the hole element 6 to the first state.

By manually unlatching the safeguard element 15 and then introducing the unlatching element, the latching element 13 is held by the trigger element 14 in its first, unlatched, open state.

Configuring the unlatching element to be manually introduced with a slightly smaller cross section than the hole of the hole element 6 here permits a minimal pivoting motion during the unlatching process already, which subsequently prevents the trigger element 14 from being automatically actuated, and hence a renewed latching of the latching element 4, as described previously.

After the second latching device 4b has been unlatched, it can again be moved freely relative to the second fixation device 3b, and the pivoting motion 23b takes place.

The first latching device 4a is now detached from the first fixation device by manually actuating the locking element 8 between the aircraft structure 1 and aircraft interior fitting element 2. As a result, element 2 can be completely detached from the first and second fixation device.

It is also generally possible and in certain embodiments desired to switch both the first and second fixation device with the first and second latching device, and thereby attach the respective devices 3a,b, 4a,b to the respective other elements aircraft structure 1 or element 2 (not shown in any more detail). A combination is also possible, for example the first fixation device 3a secured to aircraft structure 1, and the second fixation device 3b secured to element 2.

Any combination and variation is here possible. It is further possible for the movement option not to occur on the fixation or latching device under Z loads (in the Z direction), but rather under Y loads. The Z direction is here the vertical (perpendicular to the aircraft longitudinal axis).

The attachment according to the invention here allows occurring forces on the secured aircraft interior fitting element to be reliably absorbed and/or transmitted. In particular forces, but also arising torques or shear stresses, are relayed via the essentially play-free attachment to the aircraft structure.

In addition to the aforementioned loads (forces and torques) in the Z direction and Y direction (along the aircraft transverse axis or aircraft wing axis), loads are reliably absorbed and transmitted in the X direction (along the aircraft longitudinal axis or fuselage longitudinal direction).

Another exemplary embodiment of the latching device 4 of the present invention will be described below, drawing reference to FIG. 8a to c.

Figures 8A, 8C:
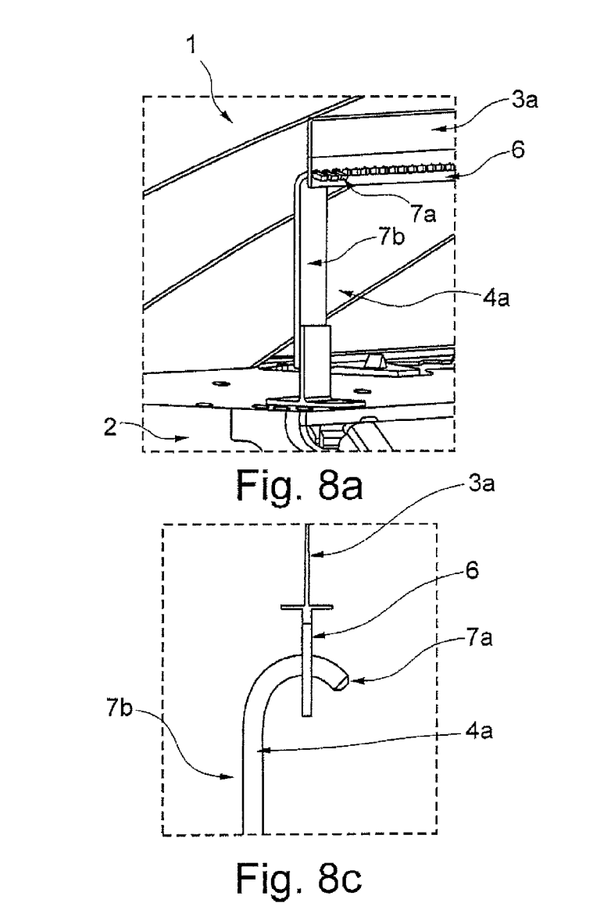
FIG. 8*a*-*c* is another exemplary embodiment of a latching device of the present invention.
Figure 8B:
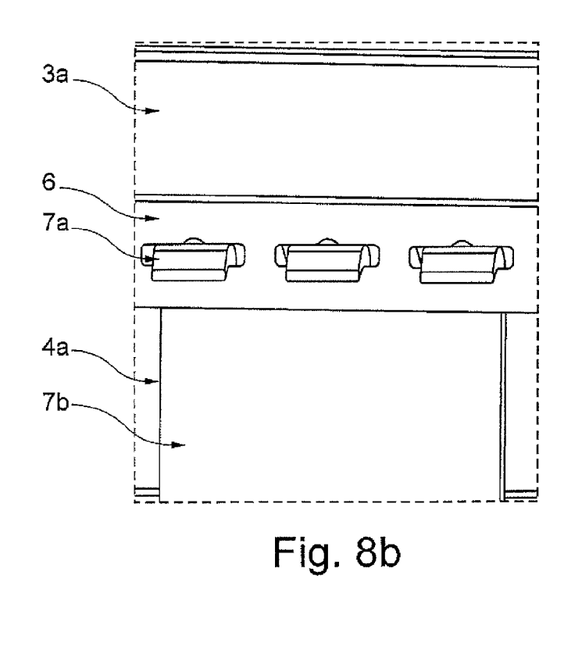

As evident from FIGS. 8a and 8b, three exemplary claws are introduced into three corresponding openings of the hole element 6, although any other number, for example even one claw, or an arrangement of claws over a large surface essentially spanning the entire length of the aircraft interior fitting element 2 is also conceivable.

When the claws of the first partial region 7a engage into the openings of the hole element 6, the aircraft interior fitting element 2 is essentially fixed in place in such a way that only a pivoting motion around an axis through the openings of the hole element 6 can be performed.

The suitable configuration of the slits of the hole element 6 can subsequently enable a defined positioning, while at the same time effectively prevent movement or slippage, for example in the X direction, meaning along the aircraft longitudinal axis.

As evident from FIG. 8c, when the claw-shaped first partial region 7a is in its introduced state, in which the second latching device 4b is connected with the second fixation device 3b, it has a projecting area. This projecting area is depicted by example on FIG. 8c to the right of the middle axis of the first fixation device 3a.

The projecting area makes it possible to easily and quickly assemble the aircraft interior fitting element 2 via the first latching device 4a or first partial region 7a of the first latching device 4 on the first fixation device 3a.

For purposes of assembly, the inclined aircraft interior fitting element 2 with secured first latching device 4a is introduced into the openings of the hole element 6 of the first fixation device 3a. These subsequently constitute the only possible axis of movement, so that the element has a rotational axis around the longitudinal axis of the openings of the hole element 6, is pivoted around the latter, and then engages with the second latching device 4b (not shown) in the second fixation device 3b (also not shown).

As soon as the claws of the first partial region 7a of the first latching device 4a have engaged into the openings of the hole element 6, essentially no more force must be applied in the Z direction to hold or carry the aircraft interior fitting element 2. In the introduced state, the weight of the element 2 is essentially relayed completely to the aircraft structure or fuselage 1 via the first fixation device 3a.

Therefore, the claws of the fist latching device 4a position the aircraft interior fitting element 2 in essentially an explicit manner, allow the latter to pivot around a defined point or defined axis, and further also ensure that the element 2 engages in a defined fashion with the second latching device 4b into the second fixation device 3b.

As a result, it is possible to quickly attach the aircraft interior fitting element 2 to the aircraft structure or fuselage 1 in a clearly determined and defined manner.

The invention is not limited in its statements to the embodiments shown on the figures. Rather, a plurality of variants is conceivable, which make use of the described solution and principle according to the invention, even given fundamentally differently configured embodiments.

Let it be additionally noted that "having" or "comprising" do not preclude any other elements or steps, and that "a" or "an" do not preclude a plurality. Let it further be noted that features or steps described with reference to one of the above exemplary embodiments may also be used in combination with other features or steps of other exemplary embodiments described above. Reference numbers in the claims are not to be construed as limitations. A specified sequence of procedural steps is also not to be construed as limiting.

REFERENCE LIST

1 Aircraft structure/fuselage
2 Aircraft interior fitting element
3a,b First, second fixation device
4a,b First, second latching device
5a,b T element
6 Hole element
7a,b First or second partial regionregion
8 Locking element
9a-d Force element
10 Movement option
11 Housing
12a,b First, second housing opening
13 Latching element
14 Trigger element
15 Safeguard element
16 Groove
17 Sliding element
17a Face part of sliding element
18 Unlatching element
19 Nose
20 Opening
21 Attachment element
22 Recess
23a Pivoting motion, attachment
23b Pivoting motion, removal

The invention claimed is:
1. An attachment system for attaching an aircraft interior fitting element to an aircraft structure, wherein the attachment system comprises:
an aircraft interior fitting element;

a first latching device rigidly coupled with one of the aircraft interior fitting element or the aircraft structure, the first latching device comprising:
a first latching element configured for attaching the first latching device to a first fixation device;
a first trigger element; and
a first retaining element;
wherein the first latching element comprises a groove corresponding to the first trigger element and the first retaining element;
wherein the first trigger element is configured to releasably secure the first latching element in an unlatched first state by engaging into the groove of the first latching element;
wherein the first retaining element is configured to releasably secure the first latching element in a latched second state by engaging into the groove of the first latching element;
wherein the first latching element is movable from the unlatched first state to the latched second state by activating the first trigger element; and
wherein the first latching element is movable from the latched second state to the unlatched first state by activating the first retaining element;
a second latching device rigidly coupled with one of the aircraft interior fitting element or the aircraft structure;
the first fixation device corresponding to the first latching device and rigidly coupled with other of the aircraft structure or aircraft interior fitting element; and
a second fixation device corresponding to the second latching device and rigidly coupled with other of the aircraft structure or aircraft interior fitting element;
wherein the first latching device and the first fixation device are rigidly detachably couplable to one another;
wherein the second latching device and the second fixation device are rigidly detachably couplable to one another;
wherein at least one of the first and second latching devices has a first portion couplable with the first or second fixation device, and a second portion rigidly connectable to the aircraft interior fitting element; and
wherein the at least one of the first and second latching devices, comprising the first and second portions, is adapted to pivot the aircraft interior fitting element relative to the first and second fixation device.

2. The attachment system according to claim 1, wherein the first portion is adapted to be movable relative to the second portion.

3. The attachment system according to claim 1, wherein the second latching device comprises:
a second latching element configured for attaching the second latching device to the second fixation device;
a second trigger element; and
a second retaining element;
wherein the second latching element is releasably securable in an unlatched first state by the second trigger element;
wherein the second latching element is releasably securable in a latched second state by the second retaining element;
wherein the second latching element is movable from the unlatched first state to the latched second state by activating the second trigger element; and
wherein the second latching element is movable from the latched second state to the unlatched first state by activating the second retaining element.

4. The attachment system according to claim 1, wherein the second latching device has a locking element in the first portion, wherein the locking element couples the second latching device and the second fixation device in a detachably rigid manner.

5. The attachment system according to claim 4, wherein at least one force element is arranged at the locking element; wherein the at least one force element detachably secures the locking element in a state that latches the second latching device and the second fixation device.

6. The attachment system according to claim 1, wherein the first portion is adapted to be movable relative to the second portion by employing at least one element from the group consisting of a hinge joint, a sliding joint, a curved joint, a screw joint, a sliding-hinge joint, a ball joint and a plate joint.

7. The attachment system according to claim 1, wherein the aircraft interior fitting element is securable to the aircraft structure substantially free of play in an attached state, wherein a respective one of the first and second latching devices is coupled with a respective one of the first and second fixation devices in the attached state.

8. An aircraft with an attachment system, for attaching an aircraft interior fitting element to an aircraft structure, wherein the attachment system comprises:
an aircraft interior fitting element;
a first latching device rigidly coupled with the aircraft interior fitting element or the aircraft structure, the first latching device comprising:
a first latching element configured for attaching the first latching device to a first fixation device;
a first trigger element; and
a first retaining element;
wherein the first latching element comprises a groove corresponding to the first trigger element and the first retaining element;
wherein the first trigger element is configured to releasably secure the first latching element in an unlatched first state by engaging into the groove of the first latching element;
wherein the first retaining element is configured to releasably secure the first latching element in a latched second state by engaging into the groove of the first latching element;
wherein the first latching element is movable from the unlatched first state to the latched second state by activating the first trigger element; and
wherein the first latching element is movable from the latched second state to the unlatched first state by activating the first retaining element;
a second latching device rigidly coupled with the aircraft interior fitting element or the aircraft structure;
the first fixation device corresponding to the first latching device and rigidly coupled with the aircraft structure or aircraft interior fitting element; and
a second fixation device corresponding to the second latching device and rigidly coupled with the aircraft structure or aircraft interior fitting element;
wherein the first latching device and the first fixation device are rigidly detachably couplable to one another;
wherein the second latching device and the second fixation device are rigidly detachably couplable to one another;
wherein at least one of the first and second latching devices has a first portion couplable with the first or second fixation device, and a second portion rigidly connectable to the aircraft interior fitting element; and
wherein the at least one of the first and second latching devices, comprising the first and second portions, is adapted to pivot the aircraft interior fitting element relative to the first and second fixation device.

* * * * *